(12) United States Patent
Shinn et al.

(10) Patent No.: US 8,797,302 B2
(45) Date of Patent: Aug. 5, 2014

(54) FLEXIBLE DISPLAY PANEL AND FABRICATING METHOD THEREOF

(75) Inventors: Ted-Hong Shinn, Hsinchu (TW);
Yi-Ching Wang, Hsinchu (TW);
Yuan-Chih Tsai, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 1149 days.

(21) Appl. No.: 12/268,774

(22) Filed: Nov. 11, 2008

(65) Prior Publication Data
US 2010/0033451 A1 Feb. 11, 2010

(30) Foreign Application Priority Data

Aug. 8, 2008 (TW) .............................. 97130349 A

(51) Int. Cl.
*G06F 3/038* (2013.01)
(52) U.S. Cl.
USPC ........... 345/204; 345/105; 345/106; 345/107; 349/187
(58) Field of Classification Search
None
See application file for complete search history.

(56) References Cited

U.S. PATENT DOCUMENTS

| | | | |
|---|---|---|---|
| 6,043,798 A * | 3/2000 | Yamamoto et al. | 345/1.1 |
| 6,888,522 B1 * | 5/2005 | Shibata et al. | 345/87 |
| 7,167,155 B1 | 1/2007 | Albert et al. | |
| 2005/0140576 A1 * | 6/2005 | Sawada et al. | 345/30 |
| 2005/0151709 A1 * | 7/2005 | Jacobson et al. | 345/84 |
| 2006/0285067 A1 * | 12/2006 | Kim | 349/187 |
| 2007/0091062 A1 * | 4/2007 | French et al. | 345/107 |
| 2007/0268245 A1 * | 11/2007 | Sugita et al. | 345/107 |
| 2008/0074730 A1 | 3/2008 | Cao et al. | |

FOREIGN PATENT DOCUMENTS

| | | |
|---|---|---|
| JP | 2006267977 A | 10/2006 |
| TW | 200705347 A | 2/2007 |
| TW | 200739228 A | 10/2007 |
| WO | 2006017129 A2 | 2/2006 |
| WO | 2007047201 A1 | 4/2007 |

OTHER PUBLICATIONS

Office Action from China Patent Office Dated Jan. 31, 2012.
Taiwan Official Action issued Jun. 20, 2012.

* cited by examiner

*Primary Examiner* — Jesus Hernandez
(74) *Attorney, Agent, or Firm* — Chun-Ming Shih

(57) ABSTRACT

In a flexible display panel and a fabricating method thereof, the flexible display panel includes a flexible substrate, a plurality of electro-phoretic pixel units, a plurality of electro-wetting pixel units, a transparent protective layer and a driving circuit. The electro-phoretic pixel units and the electro-wetting pixel units are formed in a first displaying area and a second displaying area of the flexible substrate respectively. The transparent protective layer is formed on the electro-phoretic pixel units and the electro-wetting pixel units, and the driving circuit is formed in the non-displaying area of the flexible substrate and electrically connected to the electro-phoretic pixel units and the electro-wetting pixel units. The flexible display panel may display static pictures through the electro-phoretic pixel units and display animation through the electro-wetting pixel units. Therefore, the flexible display panel has both the abilities for saving power and displaying animation.

21 Claims, 8 Drawing Sheets

FLEXIBLE DISPLAY PANEL AND FABRICATING METHOD THEREOF

BACKGROUND

1. Field of the Invention

The invention relates to a flexible display panel and a fabricating method thereof, and more particularly, to a flexible display panel having different display mediums and a fabricating method thereof.

2. Description of the Related Art

With progress of the flat display technique, more and more electrical products, especially portable electrical products such as mobile phones, e-books, digital cameras and personal digital assistants etc., are equipped with flat display apparatuses. The development trend of the portable electrical product is to achieve light weight and thin thickness, so the flat display apparatus for the portable electrical product should have these features.

It is well known that the flexible display panel not only has features of light weight and thin thickness, but also has features of flexibility and is not easy to be broken. Therefore, the development of the flexible display panel has become increasingly important. Nowadays, the popular flexible display panel is the electro-phoretic display (so-called EPD) panel. In the electro-phoretic display panel, the distribution of charged particles is controlled based on electric field to change the reflectivity of the display region with respect to the ambient light so as to display pictures. According to the display theory, the electro-phoretic display panel has bistability and needs not additional light source to illuminate, so it fills the bill of high power-saving in present flexible display panel.

However, the bistability of the electro-phoretic display makes it cannot display movie or animation needing high refresh rate. Therefore, it is one of the concerned issues by the people skilled in this art that how to make flexible display panel be capable of not only saving power but displaying colorful animation.

BRIEF SUMMARY

Therefore, the invention provides a flexible display panel with high power-saving to display animation with high refresh rate.

The invention also provides a fabricating method to fabricate a flexible display panel with high power-saving and being capable of displaying animation.

The invention provides a flexible display panel, comprising a flexible substrate, a plurality of electro-phoretic pixel units, a plurality of electro-wetting pixel units, a transparent protecting layer and a driving circuit. The flexible substrate has a first display region, a second display region and a non-display region. The electro-phoretic pixel units are disposed in the first display region of the flexible substrate, and the electro-wetting pixel units are disposed in the second display region of the flexible substrate. The transparent protecting layer is disposed on the electro-phoretic pixel unit and the electro-wetting pixel unit, and the driving circuit is disposed in the non-display region of the flexible substrate and electrically connected with the electro-phoretic pixel units and the electro-wetting pixel units.

In one embodiment of the invention, each of the electro-phoretic pixel units comprises a first reflecting layer, an electro-phoretic layer, a first pixel electrode and a first thin film transistor. The electro-phoretic layer having a plurality of charged particles is disposed above the first reflecting layer, and the first pixel electrode is disposed between the electro-phoretic layer and the first reflecting layer and electrically connected with the first thin film transistor. In one embodiment of the invention, the electro-phoretic layer may be microcup electro-phoretic layer or microcapsule electro-phoretic layer.

In one embodiment of the invention, the charged particles of each of the electro-phoretic pixel units may be red charged particles, green charged particles and blue charged particles or cyan charged particles, yellow charged particles, and magenta charged particles. In another embodiment, the charged particles of each of the electro-phoretic pixel units may comprise black charged particles and white charged particles.

In one embodiment of the invention, each of the electro-wetting pixel units comprises a second reflecting layer, an electro-wetting layer, a second pixel electrode and a second thin film transistor. The electro-wetting layer disposed on the second reflecting layer comprises a wall-based structure, a hydrophilic solution and a hydrophobic solution. The hydrophilic solution and the hydrophobic solution are both filled into the wall-based structure, and the hydrophilic solution has electric conductivity or polarity. The hydrophobic solution undissolved with the hydrophilic solution is under the hydrophilic solution. The second pixel electrode is disposed between the second reflecting layer and the electro-wetting layer and electrically connected with the second thin film transistor.

In one embodiment of the invention, the hydrophilic solution may be water, and the hydrophobic solution may be ink. The hydrophobic solution is, for example, red ink, green ink or blue ink. In the other embodiment of the invention, the hydrophobic solution is, for example, cyan ink, yellow ink, or magenta ink. Moreover, the hydrophobic solutions of all electro-wetting layers may be black ink.

In one embodiment of the invention, the flexible display panel may further comprise a color filter disposed among the electro-wetting pixel units, electro-phoretic pixel units and the transparent protecting layer.

The invention provides a fabricating method of a flexible display panel comprising the following steps: forming a flexible substrate having a first display region, a second display region and a non-display region on a glass plate; forming a plurality of electro-phoretic pixel units in the first display region of the flexible substrate; forming a plurality of electro-wetting pixel units in the second display region of the flexible substrate; forming a transparent protecting layer covering the electro-phoretic pixel units and electro-wetting pixel units; and separating the flexible substrate from the glass plate.

In one embodiment of the invention, the method of forming the electro-phoretic pixel units and the electro-wetting pixel units comprises the steps of: forming a plurality of first thin film transistors and a plurality of second thin film transistors on the flexible substrate, wherein the first thin film transistors are formed in the first display region and the second thin film transistors are formed in the second display region; forming a plurality of first pixel electrodes and a plurality of second pixel electrodes on the flexible substrate, wherein the first pixel electrodes are formed in the first display region and each of the first pixel electrodes is electrically connected to one of the first thin film transistors correspondingly, and the second pixel electrodes are formed in the second display region and each of the second pixel electrodes is electrically connected to one of the second thin film transistors correspondingly; forming an electro-phoretic layer with a plurality of charged particles on each first pixel electrode; and forming a electro-wetting layer on each second pixel electrode. The method of forming the electro-wetting layer comprises the steps of: forming a wall-based structure; and filling a hydrophilic solution and a hydrophobic solution in the wall-based structure, wherein the hydrophilic solution has electric conductivity or polarity, and the hydrophobic solution undissolved with the hydrophilic solution is under the hydrophilic solution.

In one embodiment of the invention, the electro-phoretic layer is, for example, microcup electro-phoretic layer or microcapsule electro-phoretic layer. In each of the electro-phoretic pixel units, the charged particles may comprise black charged particles and white charged particles, or may be red charged particles, green charged particles or blue charged particles. In the other embodiment, the charged particles further may be cyan, yellow, or magenta. The hydrophobic solution may be red ink, green ink or blue ink, and alternately be black ink. In the other embodiment, the hydrophobic solution may be cyan ink, yellow ink, or magenta ink.

In one embodiment of the invention, before forming the transparent protecting layer, a color filter may be formed on the electro-phoretic pixel units and the electro-wetting pixel units.

The single flexible display panel of the invention has the electro-phoretic pixel units and the electro-wetting pixel units, so that the static pictures, which are, for example, scripts, may be displayed by the electro-phoretic layer with bistability and the dynamic pictures, which are, for example, movies or animations may be displayed by the electro-wetting layer being capable of switching display state quickly. In another word, the flexible display panel of the invention has efficacy not only of saving power but of displaying animation.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1A:
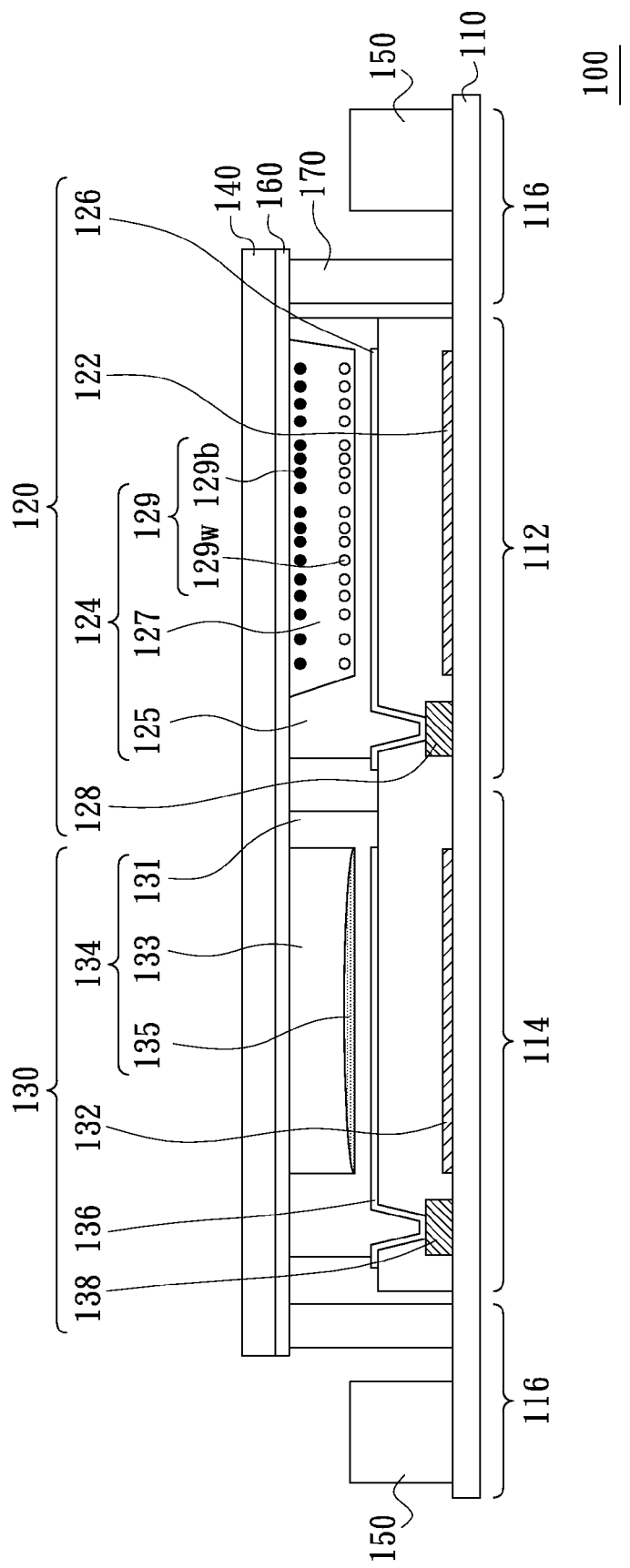
FIG. 1A is a diagram illustrating the flexible display panel during dark state according to a first embodiment of the invention.
Figure 1B:
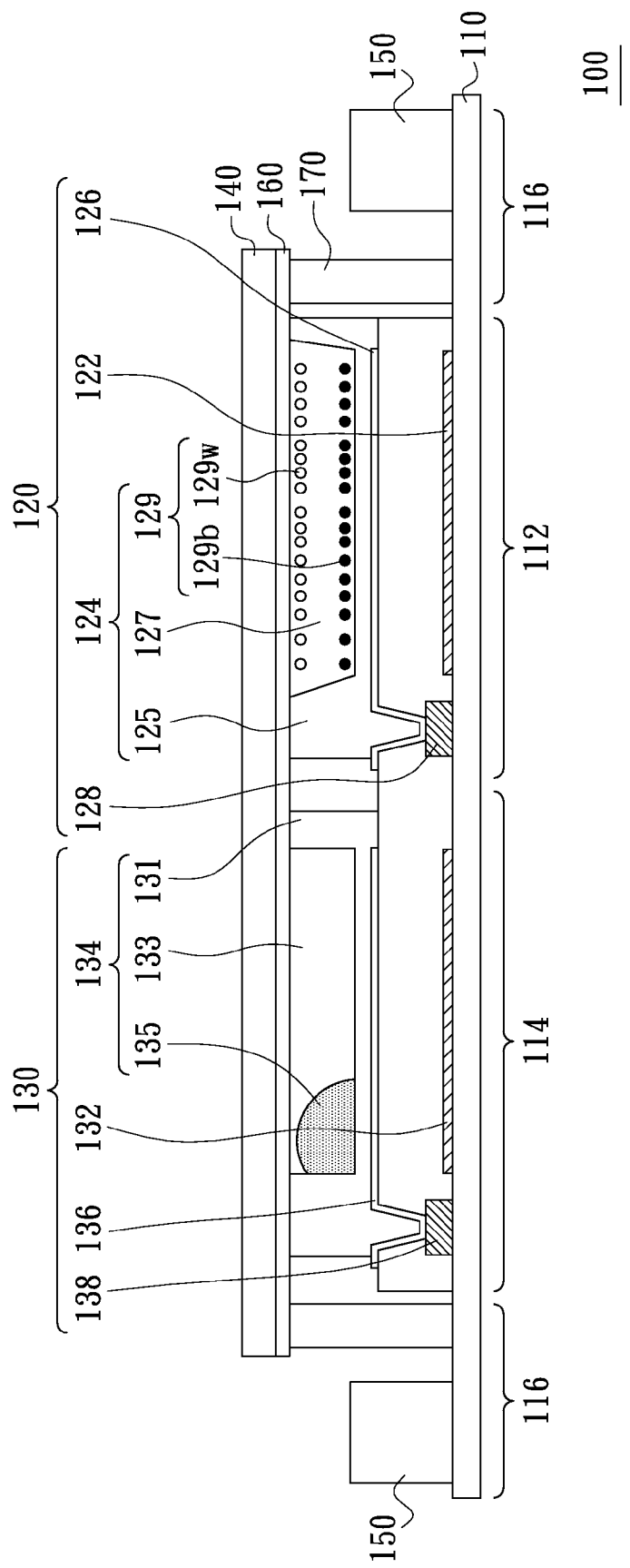
FIG. 1B is a diagram illustrating the flexible display panel during bright state according to the first embodiment of the invention.

FIG. 1A is a diagram illustrating the flexible display panel during dark state according to a first embodiment of the invention, and FIG. 1B is a diagram illustrating the flexible display panel during bright state according to the first embodiment of the invention. Referring FIGS. 1A and 1B, a flexible display panel 100 comprises a flexible substrate 110, a plurality of electro-phoretic pixel units 120, a plurality of electro-wetting pixel units 130, a transparent protecting layer 140 and a driving circuit 150. The flexible substrate 110 has a first display region 112, a second display region 114 and a non-display region 116. The electro-phoretic pixel units 120 are disposed in the first display region 112, and the electro-wetting pixel units 130 are disposed in the second display region 114. For concisely, there are only one electro-phoretic pixel unit 120 drawn in the first display region 112 and one electro-wetting pixel unit 130 drawn in the second display region 114.

In this embodiment, each electro-phoretic pixel unit 120 comprises a first reflecting layer 122, an electro-phoretic layer 124, a first pixel electrode 126 and a first thin film transistor (so-called TFT) 128. In each electro-phoretic pixel unit 120, the electro-phoretic layer 124 with a plurality of charged particles 129 is disposed above the first reflecting layer. The first pixel electrode 126 is disposed between the first reflecting layer 122 and the electro-phoretic layer 124 and electrically connected with the first thin film transistor 128. The first reflecting layer 122 is, for example, formed on the flexible substrate 110 with the gate or source/drain of the first thin film transistors 128 during the same process, The electro-phoretic layer 124 in this embodiment may be microcup electro-phoretic layer. Specifically, in each electro-phoretic pixel unit 120 of this embodiment, the electro-phoretic layer 124 comprises microcup 125, dielectric solution 127 and a plurality of charged particles 129, wherein the microcup 125 is used to contain the dielectric solution 127 and the charged particles 129. The positions of the charged particles 129 in the dielectric solution 127 may be changed according as an electric filed in the electro-phoretic pixel unit 120. In this embodiment, these charged particles 129 comprise the black charged particles 129$b$ and the white charged particles 129$w$ with opposite conductivity types to each other.

As shown in FIG. 1A, in the electro-phoretic pixel unit 120, when the black charged particles 129$b$ move to the surface of the dielectric solution 127 according to an electric field in the electro-phoretic pixel unit 120, an ambient light may be absorbed by the electro-phoretic pixel unit 120 so as to show the picture in dark state. On the other hand, as shown in FIG. 1B, when the white charged particles 129$w$ move to the surface of the dielectric solution 127 according to an electric field in the electro-phoretic pixel unit 120, the ambient light may be reflected by the first reflecting layer 122 of the electro-phoretic pixel unit 120 to show the picture in bright state.

Because the positions in the dielectric solution 127 of the charged particles 129 are changed according to the electric field in the electro-phoretic pixel unit 120, such that the display state of the electro-phoretic pixel unit 120 would not be changed without changing the electric field in the electro-phoretic pixel unit 120. Even after shutting off the power provided for the electro-phoretic pixel unit 120, the display state of the electro-phoretic pixel unit 120 is still unchanged. Therefore, the power is supplied on the electro-phoretic pixel unit 120 only while the display state of the electro-phoretic pixel unit 120 is in need of changing. Thus, the flexible display panel 100 may show the static picture by the electro-phoretic pixel units in the first display region 112 to save power.

Figure 2:
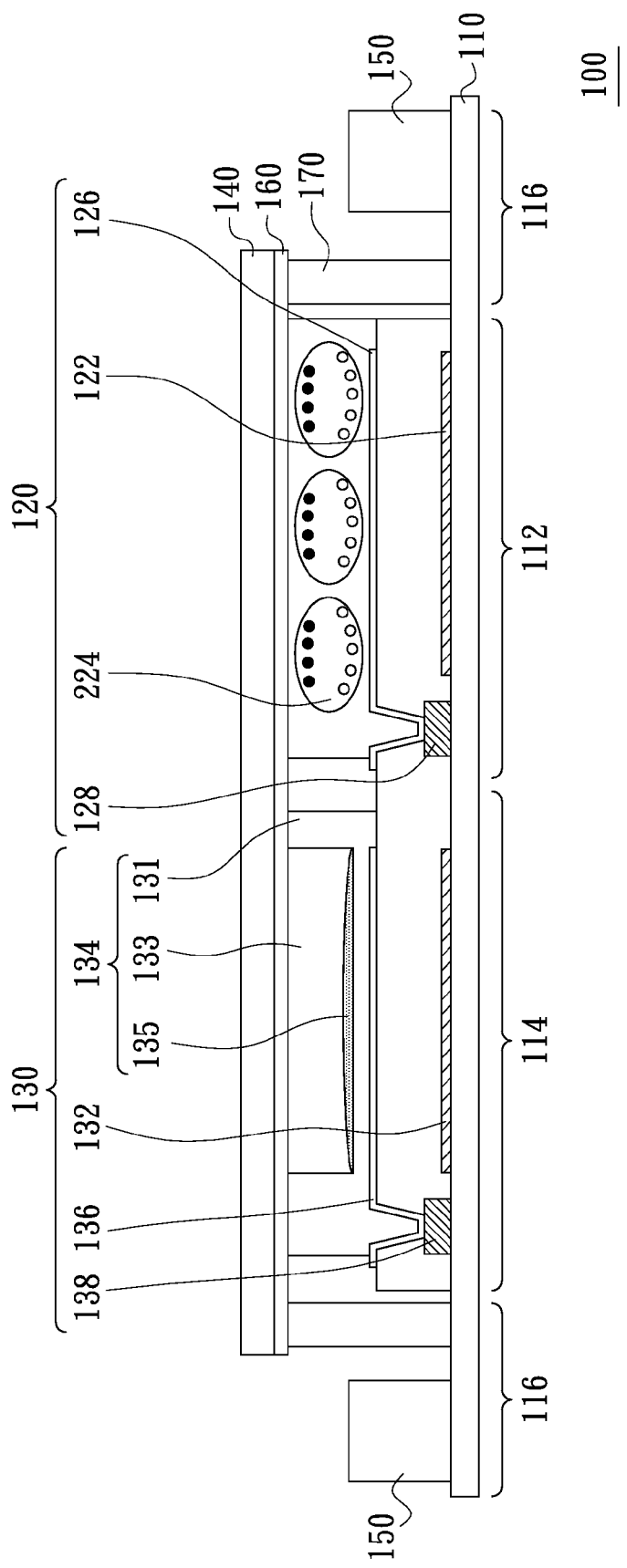
FIG. 2 is a diagram illustrating the flexible display panel according to a second embodiment of the invention.

It should be noted that the electro-phoretic layer of the electro-phoretic pixel unit 120 may be microcapsule electro-phoretic layer 224 in a second embodiment of the invention, as shown in FIG. 2.

Referring FIG. 1A again, each of the electro-wetting pixel units 130 disposed in the second display region 114 comprises a second reflecting layer 132, an electro-wetting layer 134, a second pixel electrode 136 and a second thin film transistor 138. The electro-wetting layer 134 comprising a wall-based structure 131, a hydrophilic solution 133 and a hydrophobic solution 135 is disposed above the second reflecting layer 132. The hydrophilic solution 133 and the hydrophobic solution 135 are filled in the wall-based structure 131. In another word, the wall-based structure 131 is used to contain the hydrophilic solution 133 and the hydrophobic solution 135 undissolved with each other. In this embodiment, the hydrophilic solution 133 is water and the hydrophobic solution 135 is black ink. Moreover, the internal surface of the bottom of the wall-based structure 131 has hydrophobicity so that the hydrophobic solution 135 is under the hydrophilic solution 133 and covers the internal surface of the bottom of the wall-based structure 131 at initial.

The second pixel electrode 136 is disposed between the second reflecting layer 132 and the electro-wetting layer 134 and electrically connected with the second thin film transistor 138. In this embodiment, the second reflecting layer 132 is, for example, formed on the flexible substrate 110 with the gate or source/drain of the second thin film transistors 138 during the same process.

Following the aforementioned, because the hydrophilic solution 133 has electric conductivity or polarity, the surface tension between the hydrophilic solution 133 and the hydrophobic solution 135 is changed according the field generated between the hydrophilic solution 133 and the second pixel electrode 136 by applying a voltage on the second pixel electrode 136 through the second thin film transistor 138, and then the hydrophobic solution 135 is compressed by the hydrophilic solution 133 and becomes reduced and deformed so as to explore a part of the internal surface of the bottom of the wall-based structure 131, as shown in FIG. 1B. In this situation, an incident ambient light from outside of the flexible display panel 100 is reflected by the second reflecting layer 132 of the electro-wetting pixel unit 130 such that a picture in bright state is displayed. On the other hand, as shown in figure, the internal surface of the bottom of the wall-based structure 131 is covered by the hydrophobic solution 135 until applying voltage to the second pixel electrode 136, so the incident ambient light from outside of the flexible display panel 100 is absorbed by the hydrophobic solution and a picture in dark state is displayed.

Due to the surface tension between the hydrophilic solution 133 and the hydrophobic solution 135 is changed quickly according to the field between the hydrophilic solution 133 and the second pixel electrode 136, the flexible display panel 100 can display a dynamic picture with high refresh rate by the electro-wetting pixel units 130 in second display region 114.

Specially, the second thin film transistors 138 are formed with the first thin film transistors 128 of electro-phoretic pixel units 120 during the same process, wherein the first thin film transistors 128 and the second thin film transistors 138 may be active thin film transistors, or passive thin film transistors. In addition, the second pixel electrodes 136 are formed with the first pixel electrodes 126 of the electro-phoretic pixel units 120 during the same process. It is further described in the following paragraph.

Referring to FIGS. 1A and 1B, the transparent protecting layer 140 is disposed on the electro-phoretic pixel units 120 and the electro-wetting pixel units 130. The driving circuit 150 is disposed in the non-display region 116 of the flexible substrate 110, and electrically connected to each electro-phoretic pixel unit 120 and each electro-wetting pixel unit 130 for controlling the display state of the electro-phoretic pixel units 120 and the electro-wetting pixel units 130. Furthermore, the flexible display panel 100 also comprises an edge seal 170 disposed in the border between the non-display region 116 and the first display region 112 or between the non-display region 116 and the second display region 114 for sealing the electro-phoretic layer 124 and the electro-wetting layer 134 between the flexible substrate 110 and the transparent protecting layer 140.

Moreover, the flexible display panel 100 of this embodiment further comprises a color filter 160 disposed among the transparent protecting layer 140, the electro-phoretic pixel units 120 and the electro-wetting pixel units 130. The light reflected from the first reflecting layer 122 and the second reflecting layer 132 is switched to chromatic light by the color filter 160 so as to make the flexible display panel 100 be able to display chromatic pictures in whole gamut.

In addition to dispose the color filter 160, an electro-phoretic layer 124 with color also can be used to make the flexible display panel 100 be able to display a chromatic picture in whole gamut. For example, the electro-phoretic layer 124 of each electro-phoretic pixel unit 120 has the white charged particles 129$w$ or the black charged particles 129$b$ and the chromatic dielectric solution 127. Therefore, the flexible display panel 100 is capable of displaying chromatic pictures in whole gamut. The technical details about the chromatic electro-phoretic layer 124 that one skilled in the art should know are not described herein.

Figure 3:
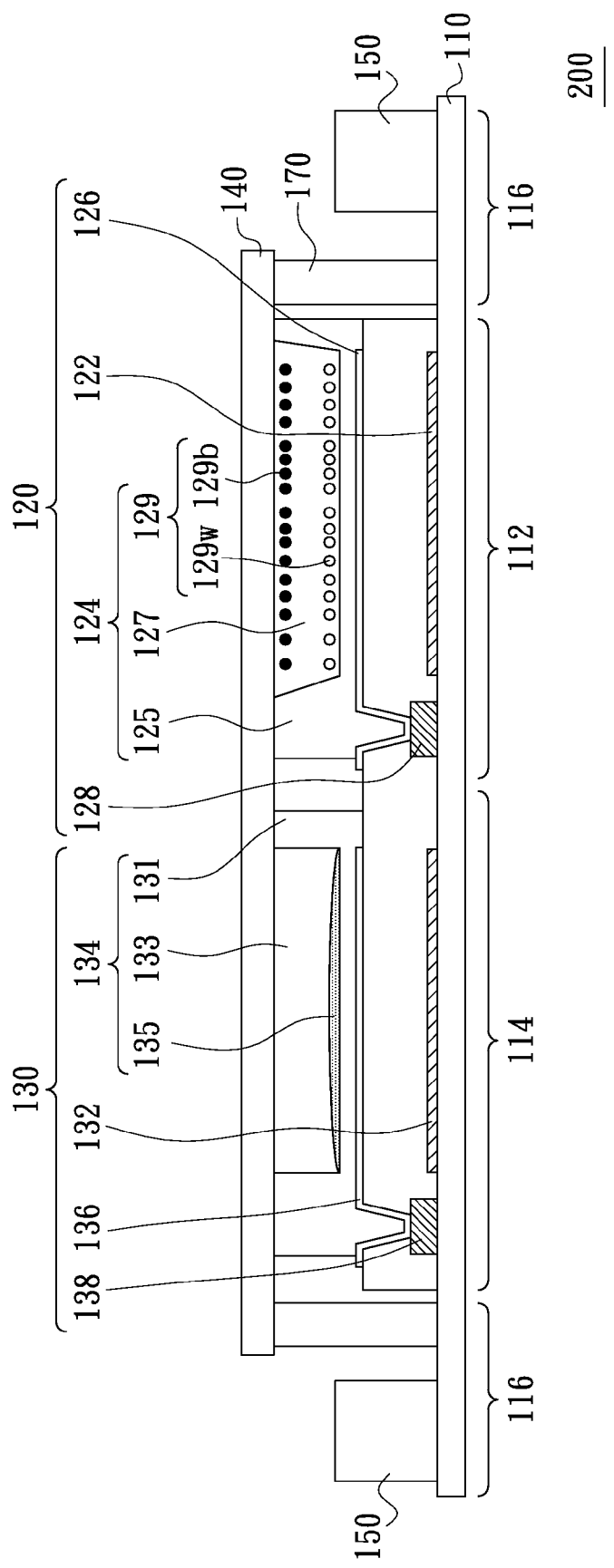
FIG. 3 is a diagram illustrating the flexible display panel according to a third embodiment of the invention.

FIG. 3 is a diagram illustrating the flexible display panel according to a third embodiment of the invention. Referring to FIG. 3, the difference between the flexible display panel 200 of this embodiment and the flexible display panel 100 of the first embodiment is the chromatic charged particles 129 of the electro-phoretic layer 124 in this embodiment. Therefore, when the charged particles 129 move to a surface of the dielectric solution 127 according to the electric field in the electro-phoretic pixel units 120, the electro-phoretic pixel units 120 show the colors of the charged particles 129. In this embodiment, the electro-phoretic pixel units 120 have red, green or blue charged particles 129 respectively so as to display chromatic pictures in whole gamut based on the three primary colors. Furthermore, the dielectric solution 127 is a solution with deep color, for example, a black solution. Alternately, the electro-phoretic pixel units 120 may have cyan, yellow, or magenta charged particles 129 respectively and the dielectric solution 127 is a white solution.

Besides, in the electro-wetting layer 134 of this embodiment, the hydrophobic solutions 135 filled into the wall-based structures 131 through, for example, ink jet printing process are red, green and blue ink or cyan, yellow, and magenta ink. Thus, in the electro-wetting pixel units 130 with the second pixel electrode 136 unapplied voltages, the light reflected from the second reflecting layer 132 is switched to a chromatic light by the hydrophobic solution 135.

As the aforementioned, due to the electro-phoretic layer 124 and the electro-wetting layer 134 are used as the display medium of the electro-phoretic pixel unit 120 and of the electro-wetting pixel unit 130 respectively, the flexible display panel 200 can display chromatic pictures without disposing color filter on the transparent protecting layer 140.

The fabricating process of the flexible display panel of the invention is described in the following paragraphs.

Figure 4A:
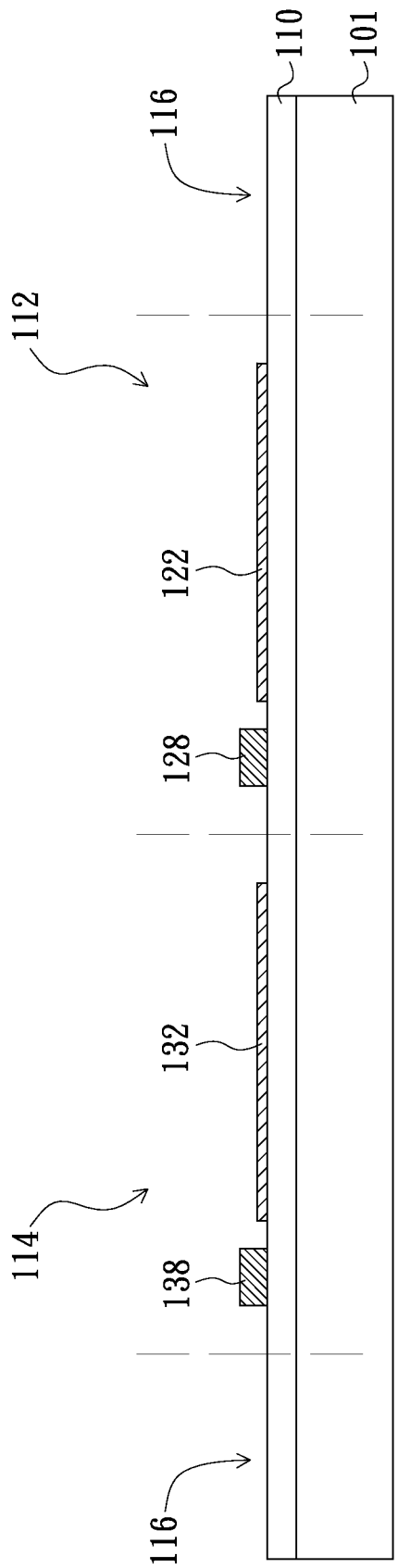
FIGS. 4A to 4D are diagrams illustrating the procedure for manufacturing the flexible display panel according to an embodiment of the invention.

FIGS. 4A to 4D are diagrams illustrating the procedures for manufacturing the flexible display panel according to an embodiment of the invention. Referring to FIG. 4A, a flexible substrate 110 is formed on a glass plate 101 at first. The method for forming the flexible substrate 110 is, for example, spread a polyimide film on the glass plate 101. Then, a plurality of electro-phoretic pixel units 120 are formed in the first display region 112 of the flexible substrate 110 and a plurality of electro-wetting pixel units 130 are formed in the second display region 114 of the flexible substrate 110. In the process of forming the electro-phoretic pixel units 120 and the electro-wetting pixel units 130, a plurality of first thin film transistors 128 and a first reflecting layer 122 are formed in the first display region 112, and a plurality of second thin film transistors 138 and a second reflecting layer 132 are formed in the second display region 114. As aforementioned, the first reflecting layer 122 is, for example, formed on the flexible substrate 110 with the gate or source/drain of the first thin film transistors 128 during the same process, and the second reflecting layer 132 is, for example, formed on the flexible substrate 110 with the gate or source/drain of the second thin film transistors 138 during the same process. Moreover, the first thin film transistors 128 and the second thin film transistors 138 are formed on the flexible substrate 110 in the same process.

Figure 4B:
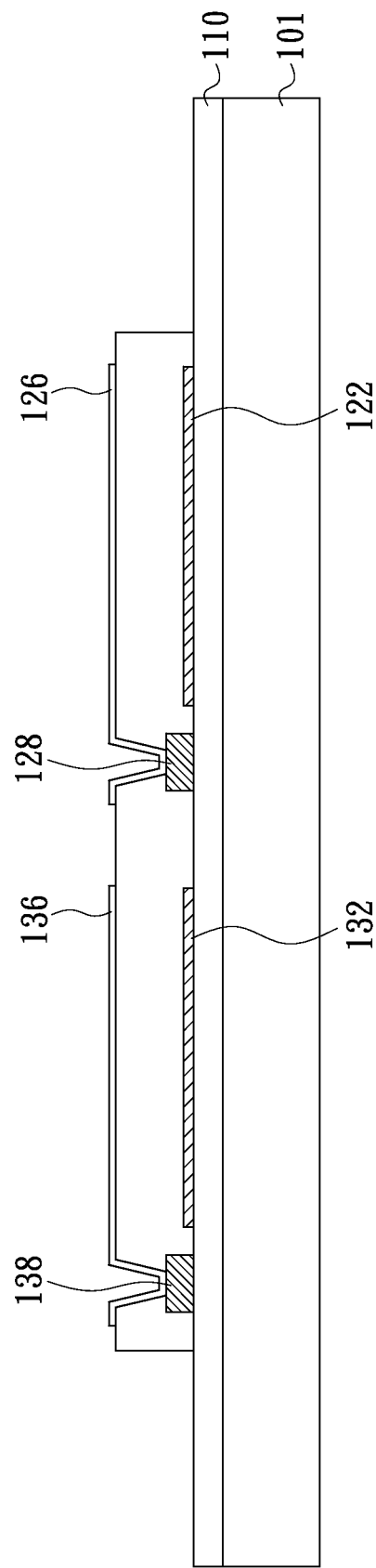

Referring to FIG. 4B, a plurality of first pixel electrodes 126 are formed above the first reflecting layer 122 and a plurality of second pixel electrodes 136 are formed above the second reflecting layer 132 at the same time. The materials of the first pixel electrodes 126 and the second pixel electrodes 136 are indium-tin-oxide(so-called ITO), indium-zinc-oxide (so-called IZO) or other transparent metal-oxide. Each of the first pixel electrodes 126 is electrically connected to one of the first thin film transistors 128 corresponding thereto, and each of the second pixel electrodes 136 is electrically connected to one of the second thin film transistor 138 corresponding thereto.

Figure 4C:
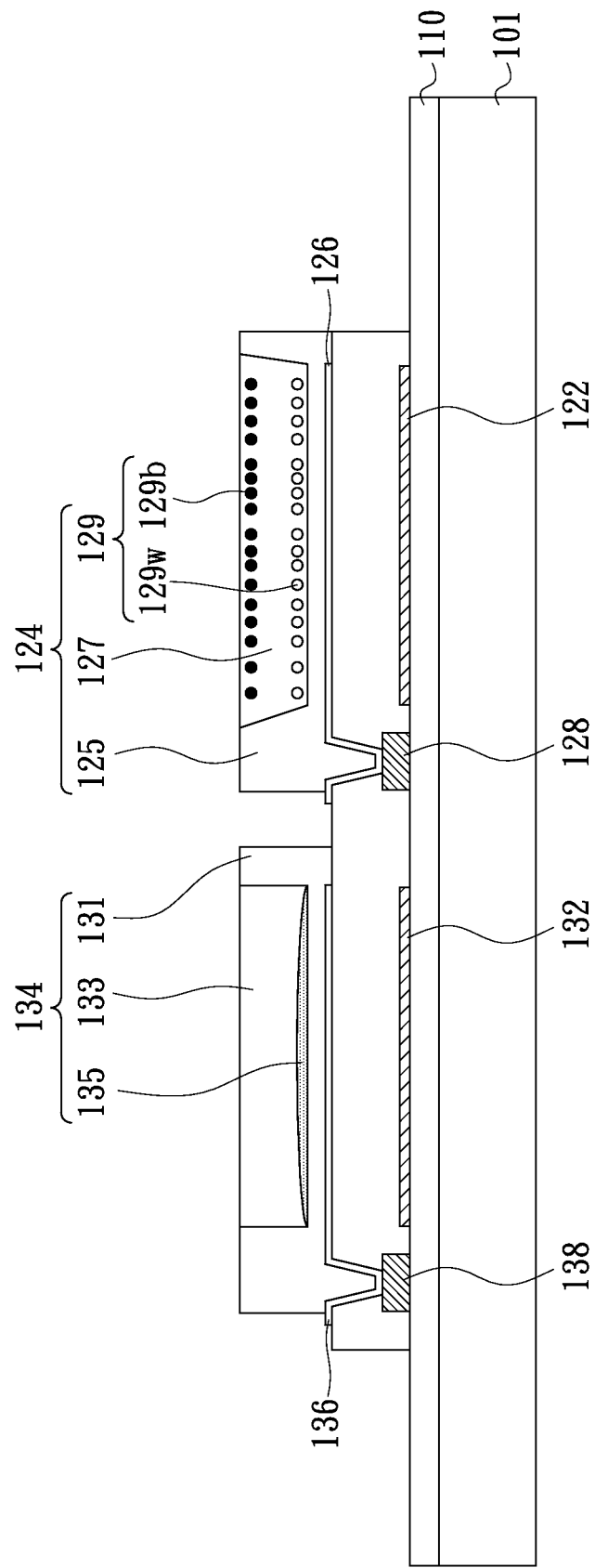

Referring to FIG. 4C, after forming the first pixel electrodes 126 and the second pixel electrodes 136, an electro-phoretic layer 124 having a plurality of charged particles 129 is formed above each first pixel electrode 126, and an electro-wetting layer 134 is formed above each second pixel electrode 136. The electro-phoretic layers 124 can be not only microcup electro-phoretic layers drawn in the figures of this embodiment but a microcapsule electro-phoretic layers drawn in FIG. 2. In single electro-phoretic pixel unit 120, the charged particles 129 of are black or white, or comprise both black and white charged particles, even chromatic charged particles, such as red, green and blue or cyan, yellow, and magenta charged particles. The details of the fabricating process of the electro-phoretic layer 124 are known by the one skilled in the art and unnecessary to be described herein.

In the fabricating process of the electro-wetting layers 134, a plurality of wall-based structures 131 are formed firstly, wherein each wall-based structure 131 is disposed above the one of the second pixel electrodes 136 corresponding thereto. Then, a hydrophilic solution 133 and a hydrophobic solution 135 are filled into each wall-based structure 131. In this embodiment, the hydrophilic solutions 133 are, for example, water and the hydrophobic solutions 135 are, for example, ink filled into wall-based structure 131 by ink jet printing process. The hydrophobic solutions 135 can be black or chromatic, such as red, green and blue or cyan, yellow, and magenta.

Figure 4D:
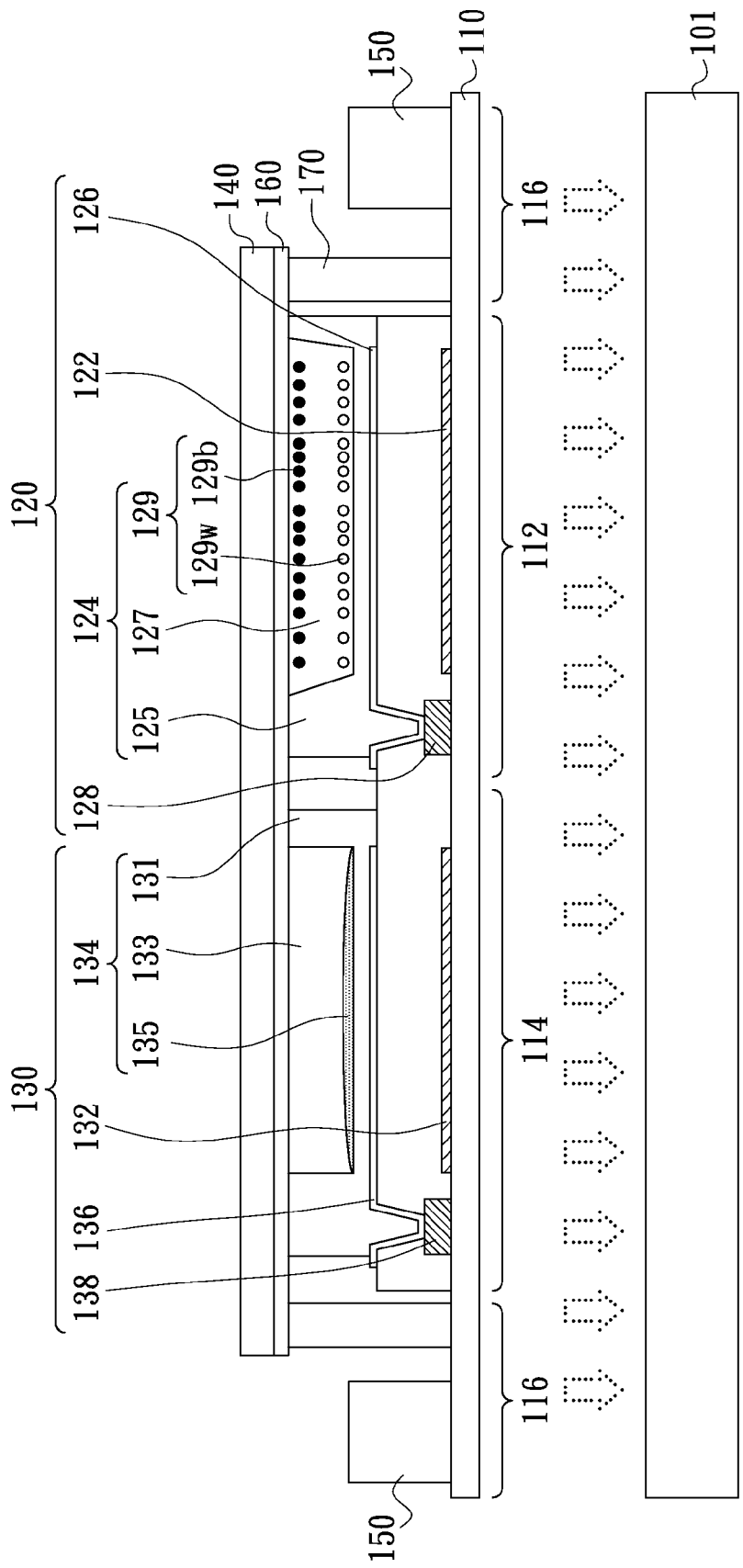

Referring to FIG. 4D, a transparent protecting layer 140 is formed on the electro-phoretic pixel units 120 and the electro-wetting pixel units 130, a driving circuit 150 is formed in the non-display region 116 of the flexible substrate 110, and then the flexible substrate 110 is separated from the glass plate 101. Therefore, the fabricating process of the flexible display panel 100 is approximately finished. The method for separating the flexible substrate 110 from the glass plate 101 is, for example, laser lift-off method. Specifically, the glass plate 101 is irradiated by laser and then the flexible substrate 110 is separated therefrom.

It should be noted that an edge seal 170 is formed in the border between the non-display region 116 and the first display region 112 or between the non-display region 116 and the second display region 114 after the transparent protecting layer 140 is formed so as to seal the electro-phoretic layer 124 and the electro-wetting layer 134 between the flexible substrate 110 and the transparent protecting layer 140.

In addition, if the charged particles 129 of the electro-phoretic layer 124 formed as shown in FIG. 4C is black or white and the hydrophobic solution 135 of the electro-wetting layer 134 is black solution, a color filter 160 as shown in FIG. 1 can be disposed on the electro-phoretic layer 124 and the electro-wetting layer 134 before forming the transparent protecting layer. Therefore, the finished flexible display panel is capable of displaying chromatic picture in whole gamut.

As described above, due to the flexible display panel of the invention has both the electro-phoretic pixel units and the electro-wetting pixel units, so that the static pictures, such as scripts, can be displayed by the electro-phoretic layer with bistability and the dynamic picture, such as movie or animation, can be displayed by the electro-wetting layer with high refresh rate. In another word, the flexible display panel of the invention is capable not only of displaying dynamic picture but of saving power.

Moreover, in the fabricating process of the flexible display panel of the invention, the electro-phoretic pixel units and the electro-wetting pixel units have high process compatibility, that is, the most elements or films of the electro-phoretic pixel units can be formed with those of the electro-wetting pixel units in the same process, so that the difference in fabrication cost between the flexible display panel of the invention and the prior electro-phoretic display panel is not very large.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A flexible display panel, comprising:
   a flexible substrate having a surface with a first display region, a second display region and a non-display region, the first display region being adjacent to the second display region and the non-display region surrounding the first display region and the second display region;
   a plurality of electro-phoretic pixel units disposed in the first display region of the surface of the flexible substrate, and each of the electro-phoretic pixel units comprising:
      a first reflecting layer;
      an electro-phoretic layer having a plurality of charged particles disposed above the first reflecting layer;
      a first pixel electrode disposed between the first reflecting layer and the electro-phoretic layer; and
      a first thin film transistor electrically connected with the first pixel electrode;
   a plurality of electro-wetting pixel units disposed in the second display region of the surface of the flexible substrate, and each of the electro-wetting pixel units comprising:
      a second reflecting layer; and
      an electro-wetting layer disposed above the second reflecting layer, wherein the electro-wetting layer comprises:
         a wall-based structure;
         a hydrophilic solution with electric conductivity or polarity filled in the wall-based structure;
         a hydrophobic solution undissolved with the hydrophilic solution filled in the wall-based structure under the hydrophilic solution;
         a second pixel electrode disposed between the second reflecting layer and the wall-based structure; and a second thin film transistor electrically connected with the second pixel electrode;

a transparent protecting layer disposed on the plurality of electro-phoretic pixel units and the plurality of electro-wetting pixel units, wherein the electro-phoretic layer and the electro-wetting layer are sealed between the flexible substrate and the transparent protecting layer; and a driving circuit disposed in the non-display region of the flexible substrate, wherein the plurality of electro-phoretic pixel units and the plurality of electro-wetting pixel units are electrically connected to the driving circuit respectively, there is an interval formed between the electro-phoretic layer and the electro-wetting layer, and the transparent protecting layer covers the interval.

2. The flexible display panel as recited in claim 1, wherein the electro-phoretic layer is a microcapsule electro-phoretic layer.

3. The flexible display panel as recited in claim 1, wherein the charged particles are red, green or blue.

4. The flexible display panel as recited in claim 1, wherein the charged particles are cyan, yellow, or magenta.

5. The flexible display panel as recited in claim 1, wherein the charged particles comprise black charged particles and white charged particles.

6. The flexible display panel as recited in claim 1, wherein the hydrophilic solution is water, and the hydrophobic solution is ink.

7. The flexible display panel as recited in claim 6, wherein the hydrophobic solution is red ink, green ink or blue ink.

8. The flexible display panel as recited in claim 6, wherein the hydrophobic solution is cyan ink, yellow ink, or magenta ink.

9. The flexible display panel as recited in claim 6, wherein the hydrophobic solution is black ink.

10. The flexible display panel as recited in claim 8, further comprising:

a color filter disposed among the transparent protecting layer and the electro-phoretic pixel units, electro-wetting pixel units and the transparent protecting layer.

11. A fabricating method of a flexible display panel, comprising:

forming a flexible substrate on a glass plate, the flexible substrate having a surface with a first display region, a second display region and a non-display region, the first display region being adjacent to the second display region and the non-display region surrounding the first display region and the second display region;

forming a plurality of electro-phoretic pixel units in the first display region of the surface of the flexible substrate;

forming a plurality of electro-wetting pixel units in the second display region of the surface of the flexible substrate;

forming a transparent protecting layer to cover the electro-phoretic pixel units and the electro-wetting pixel units;

forming a driving circuit in the non-display region of the flexible substrate, wherein the driving circuit is electrically connected to the electro-phoretic pixel units and the electro-wetting pixel units; and separating the flexible substrate from the glass plate, wherein the steps for forming the electro-phoretic pixel units and the electro-wetting pixel units comprise:

forming a plurality of first thin film transistors, a first reflecting layer, a plurality of second thin film transistors and a second reflecting layer on the flexible substrate, wherein the first thin film transistors and the first reflecting layer are located in the first display region, and the second thin film transistors and the second reflecting layer are located in the second display region;

forming a plurality of first pixel electrodes and a plurality of second pixel electrodes on the flexible substrate, wherein the first pixel electrodes are formed above the first reflecting layer, and each of the first thin film transistors is electrically connected to one of the first pixel electrodes corresponding thereto, the second pixel electrodes are formed above the second reflecting layer, and each of the second thin film transistors is electrically connected to one of the second pixel electrodes corresponding thereto;

forming an electro-phoretic layer with a plurality of charged particles above each of the first pixel electrodes;

forming an electro-wetting layer above each of the second pixel electrodes, comprising:

forming a wall-based structure above each of the second pixel electrodes; and filling a hydrophilic solution and a hydrophobic solution into each of the wall-based structure, wherein the hydrophilic solution has electric conductivity or polarity, and the hydrophobic solution undissolved with the hydrophilic solution is under the hydrophilic solution, wherein the electro-phoretic layer and the electro-wetting layer are sealed between the flexible substrate and the transparent protecting layer, there is an interval formed between the electro-phoretic layer and the electro-wetting layer, and the transparent protecting layer covers the interval.

12. The fabricating method as recited in claim 11, wherein the electro-phoretic layer is a microcapsule electro-phoretic layer.

13. The fabricating method as recited in claim 11, wherein the charged particles are red, green or blue.

14. The fabricating method as recited in claim 11, wherein the charged particles are cyan, yellow, or magenta.

15. The fabricating method as recited in claim 11, wherein the charged particles comprise black charged particles and white charged particles.

16. The fabricating method as recited in claim 11, wherein the steps for filling the hydrophilic solution and the hydrophobic solution of each electro-wetting layer comprise:

filling ink into the wall-based structure as the hydrophobic solution by inkjet process; and filling water into the wall-based structure as the hydrophilic solution.

17. The fabricating method as recited in claim 16, wherein the hydrophobic solution is red ink, green ink or blue ink.

18. The fabricating method as recited in claim 16, wherein the hydrophobic solution is cyan ink, yellow ink, or magenta ink.

19. The fabricating method as recited in claim 16, wherein the hydrophobic solution is black ink.

20. The fabricating method as recited in claim 19, further comprising forming a color filter on the electro-phoretic pixel units and the electro-wetting pixel units before forming the transparent protecting layer.

21. The fabricating method as recited in claim 11, wherein the method of separating the glass plate and the flexible substrate comprises laser lift-off method.

* * * * *